US009763538B2

(12) United States Patent
Bentley

(10) Patent No.: US 9,763,538 B2
(45) Date of Patent: Sep. 19, 2017

(54) MACHINES FOR THE PREPARATION OF BEVERAGE AND LIQUID FOOD PRODUCTS

(71) Applicant: Koninklijke Douwe Egberts B.V., Utrecht (NL)

(72) Inventor: Andrew Bentley, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 145 days.

(21) Appl. No.: 14/736,141

(22) Filed: Jun. 10, 2015

(65) Prior Publication Data
US 2016/0058239 A1 Mar. 3, 2016

(30) Foreign Application Priority Data
Aug. 28, 2014 (GB) .................................. 1415233.4

(51) Int. Cl.
A47J 31/46 (2006.01)
A47J 31/06 (2006.01)
A47J 31/22 (2006.01)
A47J 31/44 (2006.01)
A23F 5/12 (2006.01)
A23C 9/15 (2006.01)
A23F 5/26 (2006.01)
(Continued)

(52) U.S. Cl.
CPC .............. *A47J 31/46* (2013.01); *A23C 9/1508* (2013.01); *A23F 5/125* (2013.01); *A23F 5/26* (2013.01); *A23L 33/15* (2016.08); *A47J 31/0605* (2013.01); *A47J 31/0631* (2013.01); *A47J 31/0642* (2013.01); *A47J 31/0668* (2013.01); *A47J 31/22* (2013.01); *A47J 31/40* (2013.01); *A47J 31/4403* (2013.01); *A47J 31/4492* (2013.01); *A47J 31/4496* (2013.01); *B01F 1/0027* (2013.01); *B01F 3/0446* (2013.01); *B01F 3/04446* (2013.01); *B01F 5/0206* (2013.01); *A23V 2002/00* (2013.01)

(58) Field of Classification Search
CPC .......... A23F 5/125; A23F 5/26; A23C 9/1508; B01F 5/026; B01F 1/0027; B01F 3/04446; B01F 3/0446; A23L 33/15; A23V 2002/00
See application file for complete search history.

(56) References Cited

U.S. PATENT DOCUMENTS
2006/0137081 A1 6/2006 Ferrara et al.

FOREIGN PATENT DOCUMENTS
EP 1440644 A1 7/2004
EP 1440903 A1 7/2004
(Continued)

*Primary Examiner* — Anthony Weier
(74) *Attorney, Agent, or Firm* — Fitch, Even, Tabin & Flannery LLP

(57) ABSTRACT

The present application relates to improvements in machines for the preparation of beverage and food products, and in particular to such a machine which utilizes a compressed tablet of food or beverage product, which is inserted into the brew chamber of the machine, into which a liquid is directed to break up or dissolve the tablet. The machine for preparing a beverage or food product from a compressed disc of at least one ingredient includes a sealable brew chamber, and said brew chamber includes means for mounting the disc so that it is able to spin freely around a central axis. The brew chamber further includes an at least one nozzle having an outlet in the brew chamber located to direct a jet of liquid at a peripheral edge of the disc mounted in the brew chamber.

18 Claims, 3 Drawing Sheets

(51) Int. Cl.
*A47J 31/40* (2006.01)
*B01F 5/02* (2006.01)
*B01F 1/00* (2006.01)
*B01F 3/04* (2006.01)
*A23L 33/15* (2016.01)

(56) References Cited

FOREIGN PATENT DOCUMENTS

| | | |
|---|---|---|
| EP | 1659909 A1 | 5/2006 |
| EP | 2339238 A1 | 6/2011 |
| WO | 2005020769 A1 | 3/2005 |

MACHINES FOR THE PREPARATION OF BEVERAGE AND LIQUID FOOD PRODUCTS

CROSS REFERENCE TO RELATED APPLICATION

This application claims the benefit of Great Britain Application No. 1415233.4, filed Aug. 28, 2014, and which is hereby incorporate by reference in its entirety.

TECHNICAL FIELD

The present disclosure relates to improvements in machines for the preparation of beverage and food products, and in particular to such a machine which utilizes a compressed tablet of food or beverage product, which is inserted into the brew chamber of the machine, into which a liquid is directed to break up or dissolve the tablet.

BACKGROUND

Automated brewing machines and other on-demand beverage systems for brewing beverages, such as coffee and tea, or for preparing food products usually have a reservoir, in which the brewing liquid, most commonly water, is heated by a heating element. The heated liquid is then pumped from the reservoir to a brewing chamber which holds brewing ingredients, such as coffee grounds or tea leaves. The heated liquid flows through the brewing ingredients to produce a brewed beverage. The beverage is then directed out of the brewing chamber into a container such as a jug or cup located beneath the brewing chamber outlet.

Many modern domestic beverage machines are designed to dispense individual servings of a beverage directly into a drinking receptacle, and derive the beverage from a bulk supply of beverage ingredients or from individual packages of beverage ingredients such as pods, pads or cartridges. Machines which use such individual packages reduce the need for cleaning and can enable the user to make a selection of beverages such as coffee, tea, hot chocolate and the like.

An example of one type of such cartridge is described in EP-A-1440903. The beverages are formed from brewing, mixing, dissolving or suspending the beverage ingredients in water or another liquid. For example for coffee beverages, heated water is forced through the cartridges under pressure to extract the aromatic constituents from the compacted coffee grounds contained therein. The use of cartridges in such machines has become increasingly popular due to their convenience and the quality of the beverage produced.

However, in order to try and minimise the packaging used in such single serve on demand machines, it has been proposed to replace the cartridges with tablets of compressed beverage or food product. Such tablets can conveniently be sold in a multipack format.

One of the problems that has been found with using compressed powder tablets in an on-demand machine is that of achieving a sufficiently rapid and even rate of dissolution, so that all of the powder is entirely dissolved. Conventional methods of dissolving tablets include breaking up the tablet by incorporating disintegrants or by crushing the tablet to increase the surface area. Once a tablet is crushed, it is possible that parts of the tablet are bypassed by a metered dose of water flowing through the brew chamber, with the result that the tablet may not be fully dissolved and the resulting beverage or food product is too weak.

It is well known that creating turbulence helps speed up the rate of dissolution of tablets. This can be achieved by methods such as mechanical agitation (stirring), ultra-sonic energy or by using high velocity water jets. The problem with a single water jet is that its energy dissolves the part of the tablet upon which it impinges, and so the jet must be moved over the tablet surface to promote even dissolution. Multiple jets acting on the tablet are a way of achieving better coverage, but the average flow rate and pressure must be increased proportionately to achieve the same jet velocity. If some jets break through the tablet before others then they simply waste energy and dilute the resulting beverage outflow.

It is an object of the present disclosure to provide an improved machine for the preparation of beverages and food products which utilizes a high energy water jet to break up a tablet of compressed ingredients, which overcomes these disadvantages.

SUMMARY

The present disclosure therefore provides a machine for preparing a beverage or food product from a compressed disc of at least one ingredient, said machine comprising a sealable brew chamber, said brew chamber comprising means for mounting the disc so that it is able to spin freely around a central axis, and at least one nozzle having an outlet in the brew chamber located to direct a jet of liquid at a peripheral edge of the disc mounted in the brew chamber.

The disclosure further provides a system for the preparation of a beverage or food product comprising the machine and a compressed disc of at least one ingredient.

The disclosure further provides a method of dispensing a beverage or food product comprising the steps of mounting a compressed disc of at least one ingredient so that it is able to spin around a central axis and spraying at least one jet of liquid at a peripheral edge of the disc.

The use of a water jet to spin a tablet of compressed powder in the form of a disc around a central axis advantageously gives a rapid and even break down or dissolution of the ingredients.

A single impact point of the water jet very efficiently focuses the available energy around the entire periphery of the disc. This allows the brewing machine to have a very simple brew chamber with only one moving part (the disc), which not only helps to keep maintenance costs low, but can be implemented at low cost.

BRIEF DESCRIPTION OF THE DRAWINGS

Preferred embodiments of a machine for the preparation of beverages and food products will now be described, by way of example only, with reference to the accompanying drawings in which.

DETAILED DESCRIPTION

The present disclosure is directed to a machine for preparing beverage and food products from a compressed tablet of food or beverage product. The tablet is in the form of a disc, which is inserted into the brew chamber of the machine. The correct preparation (brew) cycle is selected, either manually or automatically on recognition of the product, and a jet of water or other liquid is directed on to the disc to cause it to dissolve or disintegrate in a controlled manner and enable the food or beverage product to be prepared for dispensing. Optionally the machine, or the disc, may also include means to condition the product, for example to add a foam, crema or cream layer.

The discs may be made from powdered or granulated particulate ingredients such as soluble coffee, roast and ground coffee, milk powder, chocolate powder and the like. The ingredients themselves may be soluble, in which case they gradually dissolve under the influence of the liquid jet to produce the product. Alternatively the ingredients may be wholly or partially insoluble. In the latter case the ingredients may be bound together with a binding agent which is either soluble or which will break down easily under the influence of the jet of liquid. In the latter case a suspension of insoluble particles in the liquid is formed, which requires brewing or steeping and subsequent filtration to prepare the final product.

The particle size will vary in size according to the nature of the ingredients, typically from around 20 μm to 400 μm. The density of the discs will also vary according to the nature of the ingredients, some of which may be in the range of 800 kg/m$^3$ to 1500 kg/m$^{3'}$ although this is not a limiting range. A suitable diameter for a single-portion coffee or milk disc is in the range of 50-60 mm. If the disc is much larger then the effectiveness of the liquid jet will diminish as the disc reduces in diameter. The maximum thickness of the disc will be only limited by the ability to form an evenly distributed jet spray over its entire edge. However, from a practical point of view, a suitable thickness for the disc is less than half of its diameter.

Figure 1:
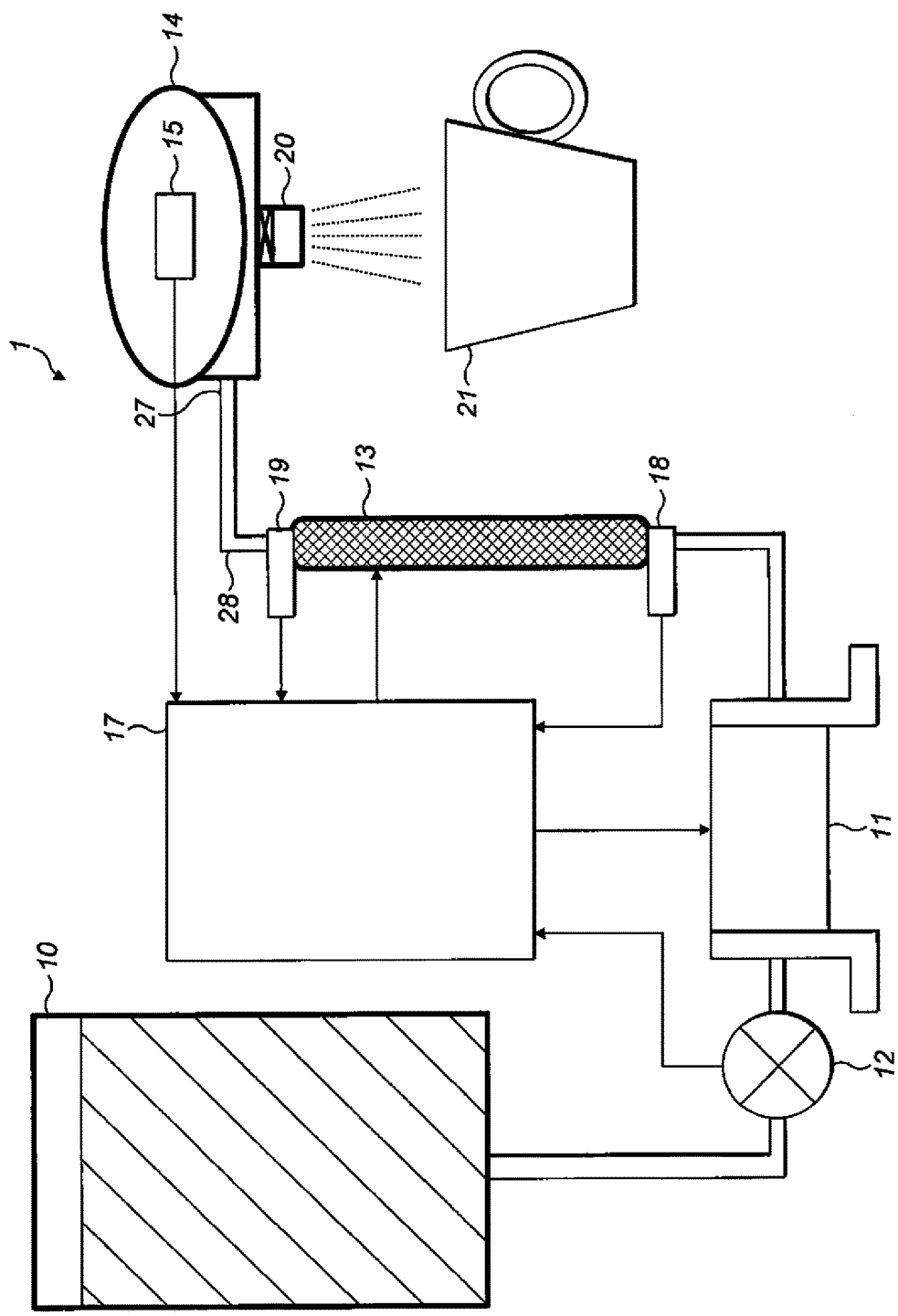
FIG. 1 is a schematic diagram representing a machine for preparing beverage and food products.

The machine 1 for preparing beverage or food products is illustrated schematically in FIG. 1. The machine 1 preferably comprises a reservoir 10 for the liquid, although it may be linked directly to a water supply. Whilst water is likely to be the most common liquid used in preparing beverages such as coffee, the machine 1 is also capable of handling other liquids, such as milk or milk preparations, for mixing with the beverage or food ingredients. The reservoir 10 is fluidly connected to a pump 11, preferably via a flow meter 12, which in turn is connected to a heating device 13. The heating device 13 is fluidly connected to the brew head 14 by means of a suitable fluid conduit 28. It should be noted that the machine of the present disclosure is not limited to preparing products which must be "brewed"; the use of the terms "brew" and "brew head" and the like are for convenience only as the technology originates from machines which were limited to brewing beverages.

The brew head 14 preferably includes a disc recognition device 15 which may recognise the product type and size of a disc 16 inserted into a brew chamber 22 inside the brew head 14 to enable the correct brew cycle to be initiated.

The pump 11, the flow meter 12, the water heater and the brew head 14 (and other components) are preferably connected to an electronic controller 17. In addition water temperature monitors 18, 19 may be located at the inflow to, and the outflow from, the water heater 13, which are also connected to the controller 17.

The operational behaviour of the machine is preferably determined by software embedded in the controller 17, for example as described in EP-A-1440644. The memory of the control processor includes one or more variables for one or more operational parameters for the machine.

Figure 2:
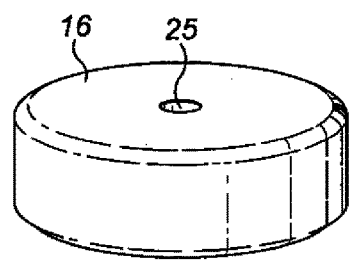
FIGS. 2 and 2a are, respectively, a pictorial representation and a cross sectional front elevation of a compressed powder disc for use in the machine of FIG. 1.
Figure 2A:
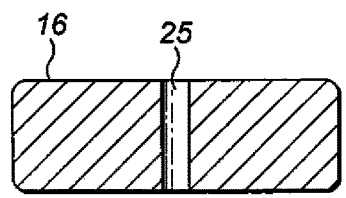

The disc 16 (see FIG. 2) has a central bore 25 to enable the disc to be mounted on a spindle 26 which extends upwardly in a substantially vertical direction from a base of the brew chamber 22.

The chamber 22 has an outlet to enable the food or beverage product to drain out of the chamber 22 for dispensing via a dispensing nozzle 20. The outlet may be fixed, for example in the form of at least one, and more preferably a series of, drain apertures or holes in the base of the chamber 22. The dimensions of the apertures are selected to prevent the brewing liquid from draining too rapidly from the chamber 22, before the full disintegration of the disc 16 or brew of the product has occurred. The disintegration of the disc 16 is significantly improved if the drainage rate is restricted, so that the brew chamber 22 is substantially flooded during brewing. The disadvantage of a completely flooded chamber 22 is that there is a reduced foaming effect in the delivered beverage or food product. Alternatively the chamber 22 may be provided with valve means which are operable to vary the flow rate out of the outlet.

The foam quality on the resulting beverage may be manipulated by admitting gas into the brew chamber 22, where it is entrained by the high energy jet. The drainage rate of the brew chamber 22 is important in this respect and complete flooding is also preferably avoided.

The relative diameters of the disc bore 25 and the spindle 26 are such that the disc 16 is able to freely rotate on the spindle 26.

Figure 4:
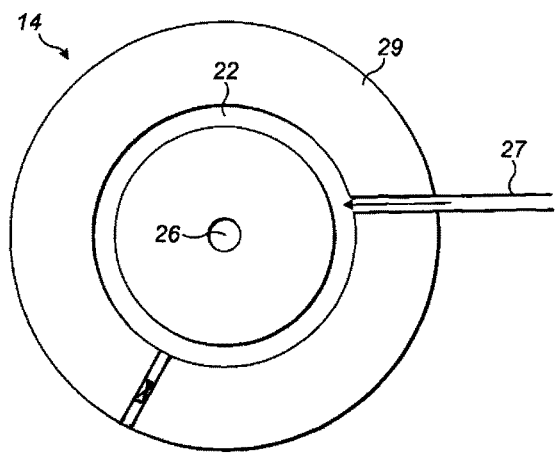
FIG. 4 is a plan view of a disc mounted in the brew head of the machine of FIG. 1 with parts omitted for clarity.

A nozzle 27 is provided at an end of the fluid conduit 28 which conducts the brew liquid from the heating device 13 to the brew head 14, and is located with an outlet in the brew chamber 22 in a side wall 29 of the brew chamber 22 (see FIG. 4). The nozzle 27 is arranged so as to direct a single high velocity jet of liquid directly at the peripheral edge of a disc 16 mounted on the spindle 26. This is the preferred position for the nozzle 27 as it ensures that the jet will always impinge on the peripheral edge of the disc 16, even as it reduces in diameter.

In an alternative configuration, however, the nozzle 27 may be arranged so as to direct the jet of liquid from above and at the edge of the disc 16.

In one embodiment the jet has a velocity of 19.5 m/s at 200 ml/min with a pressure of 13 bar. A higher velocity water jet impinging on the tablet will improve dissolution. However, because of practical difficulties in making and operating finer jet apertures, the easiest way to increase velocity will be to increase pressure and flow rate, but care must be taken not to over-dilute the product. In another embodiment the jet is pulse-modulated, reducing the average flow rate to cup, but raising instantaneous jet velocity. Pulse modulation may be used to provide short bursts of high velocity jets, maintaining revolution of the immersed disc in the chamber. With the same jet aperture, and 25% duty cycle the flow rate may be increased to 800 ml/min (78 m/s).

In a further alternative configuration multiple nozzles 27 may be used to provide multiple jets of liquid at different points around the circumference of the disc 16.

The brew head 14 preferably has an upper section which can be moved between an open position, in which the brew chamber 22 is exposed so that a disc can be mounted on the spindle 26, and a closed position in which the brew chamber 22 is closed and sealed. This is preferably effected by means of a handle or lever, but may be automatic. When the brew head 14 is closed, the brew chamber 22 is sealed by the upper section of the brew head 14, with a silicon rubber seal or the like.

The brew chamber 22 is preferably cylindrical, but it may have any suitable configuration. In one suitable configuration the chamber 22 has internal dimensions of 28 mm to 75 mm diameter and 13 mm to 40 mm height, and the spindle has a diameter of 3 mm.

Figure 5:
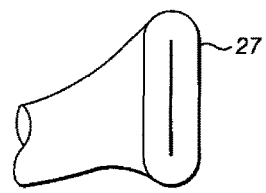
FIG. 5 is a pictorial representation of a nozzle for injecting liquid into the brew head.

One suitable shape for the nozzle(s) 27 is shown in FIG. 5. This gives a "fan" shaped spray, preferably of about the same height as the disc 16. In one suitable configuration the size of the nozzle 27 is such as to give a mean flow rate of about 200 ml/min and this is provided by a slot dimension of approximately 3.8 mm by 0.045 mm, giving a jet velocity of about 19.5 m/s. The back pressure on the pump 11 at this flow rate is approximately 13 bar. The flow rate may need to be higher for some types of discs, depending on the degree of compaction and the ingredients (in particular the solubility of the ingredients or binder and the particle size) from which they are made. The flow rate is therefore preferably adjustable, for example to approximately 280 ml/min, with a back pressure of 9 bar.

When air is allowed into a partially flooded chamber 22, the energy of the jet very efficiently mixes the gas into the beverage or food product to create fine foams, especially with milk powder discs. Because there is very little pressure in the chamber 22 an air inlet, in the form of a "breather" tube or hole, may be provided to allow air to be introduced into the centre of the chamber 22, which is the lowest pressure point. This air inlet hole may be selectively opened or closed by solenoid valve, depending on the type of product being brewed, in order to create a foamed beverage or food product. Another suitable air inlet would be an eductor formed as part of the nozzle 27 in the configuration shown in FIG. 4. The eductor draws in air due to the high velocity of liquid flowing through the nozzle 27.

According to the type of disc 16, or product being prepared, it is preferable to select different ratios between the flow rate in and the flow rate out. If the flow rate in is greater than flow out, then the disc 16 is fully immersed in a revolving liquid bath, and the dissolution/brew rate is increased. If the chamber 22 is only partially flooded, and part of the water jet is above the water level this will result in better foaming. To achieve this, the incoming flow of liquid is preferably greater than flow out initially, and the flow is then gradually balanced to maintain a steady level. In this condition, the air inlet hole solenoid may be opened to help create more foam. Alternatively, an air eductor may be formed as part of the high velocity water jet nozzle 27; this may be opened or closed on demand by using a solenoid valve.

Balancing of inlet or outlet flow rates may be achieved by the use of an adjustable valve on the chamber outlet (either automatic control or manually selectable) or by pulsing the jet with variable duty cycle. Jet pulsing has been found to be a very effective way of regulating flow rate to cup, preventing over-dilution whilst maintaining good tablet disintegration times.

An effervescent material may be used as a part of the disc 16 to introduce gas into the sealed chamber 22, which would then be further conditioned by the energy of the jet.

Operation of the machine comprises the steps of opening the brew head 14, inserting a disc 16 onto the spindle 26 in the brew chamber 22, closing the brew head 14, and carrying out the brew cycle in which the beverage/food product is prepared.

During the brew cycle, the jet (or jets) impinges on the circumferential edge of the disc 16, causing the disc 16 to rotate and disintegrate either by erosion or as the ingredient(s)/binder dissolves. The energy imparted to the disc 16 causes immediate localised surface break-up at the point of impact and forces it to revolve at high speed in the surrounding liquid, thus washing away any loosened material and ensuring that every part of the disc 16 is evenly and rapidly broken up.

The beverage or food product exits the brew chamber 22 via the drain holes in the base of the chamber 22 to an outlet 20 for dispensing, preferably into a suitably positioned receptacle 21.

It can be seen in tests that, in using a jet of liquid in this manner, the initial beverage or food product outlet stream achieves colour and strength very rapidly. The disc 16 disintegrates at a very even rate until, eventually, the whole disc is broken up. The process can be adapted to suit a variety of powdered food ingredients by means of adjusting the mean flow rates, the jet velocity or by pulsing the jet during a brew cycle.

For certain types of disc 16, such as those made from roast and ground coffee, a filter may be provided to carry out a filtration step before the finished product is dispensed.

Figure 3:
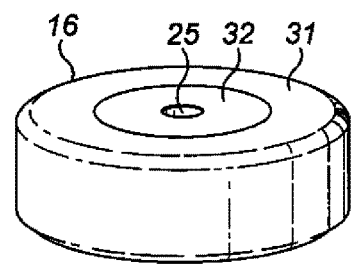
FIGS. 3 and 3a are, respectively, a pictorial representation and a cross sectional front elevation of an alternative disc for use in the machine of FIG. 1.
Figure 3A:
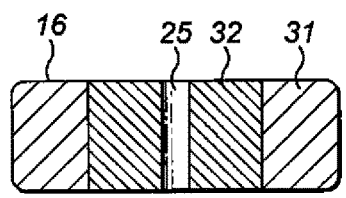
Figure 3B:
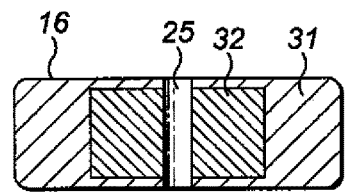
FIG. 3b is a cross sectional front elevation of a further alternative disc for use in the machine of FIG. 1.

In order to create "layered" drinks, the discs 16 may comprise multiple ingredients compacted in one or more concentric rings or layers 31, 32. FIGS. 3, 3*a* illustrate an example of a layered disc 16 comprising rings of coffee and milk 32. As the diameter of the disc 16 is progressively reduced, the colour of the beverage will change from black coffee to white coffee (or vice versa). In FIG. 3*b* a different configuration is illustrated as the milk layer 32 is wholly encapsulated in the coffee layer 31.

Figure 6:
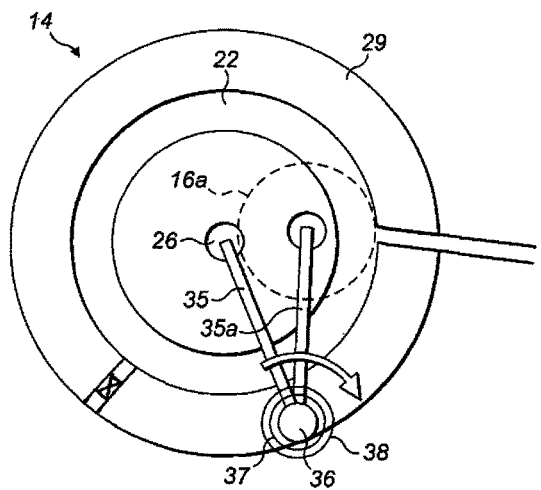
FIG. 6 is a plan view of alternate means for mounting the disc in the brew head.

The spindle 26 may also be designed to automatically adjust for different sized discs 16, as shown in FIG. 6. The spindle 26 may be mounted on a spring-loaded arm 35 that is free to rotate about a pivot point 36 fitted with a rotary angle position sensor 37, such as a potentiometer. Initially, the arm 35 is moved to a loading position when the brew head 14 is opened. Closing the brew head 14 allows a spring 38 to bias the spindle 26 towards the nozzle 27 so that disc 16 is held against, or close to, the nozzle 27. This allows the starting diameter of the disc 16 to be measured from the angular position of the arm 35. The force of the water jet, at a known flow rate, keeps the disc surface a fixed distance away from the nozzle outlet, and so allows the progress of disc disintegration to be estimated from the angle of the spindle arm 35. Movement of the arm 35*a* and disintegration of the disc 16*a* is illustrated in dotted lines. The position of the disc 16, however, must be such that the jet of liquid hitting the disc 16 must not be impeded. An end stop may be placed close to the nozzle 27, at a distance of 2 to 3 mm, which acts as a datum so that the disc diameter may be estimated using the angle sensor 37.

A closed-loop feedback system may be employed to create optimal brewing cycles for various types or sizes of compressed discs 16. Flow rates may be continuously varied or pulsed and the effect on the disc 16 may be dynamically measured. Pulsing provides a better way of estimating the disc diameter as the disc 16 would temporarily come to rest against the end stop when the jet stops.

Experimental tests were carried out on a test rig with different discs 16 comparing the time taken for the disc 16 to disintegrate in a cup (1.) and in the test rig (2.) with a jet of liquid according to the present disclosure. The following results were obtained.

EXAMPLE 1

This uses an effervescent 5 g vitamin tablet having a diameter of 25.4 mm and a height of 6.7 mm (Berocca™ orange flavour). The disc was dissolved using ambient water at 20° C.

1. In cup—the time to dissolve by stirring in 100 ml of cold water was 1 m 30 s.
2. In brew chamber—the time to dissolve in 180 ml of water was 55 s.

EXAMPLE 2

This uses a compressed 1.2 g milk powder disc having a diameter of 16.3 mm and a height of 6.5 mm. The disc was dissolved using hot water at 80° C.

1. In cup—the time to dissolve by stirring in 100 ml of hot water was 3 minutes.
2. In brew chamber—time to dissolve in 85 ml of hot water was 25 s.

Although the disc in the cup broke up very shortly after immersion in water, even with vigorous stirring it was not possible to completely dissolve some solid lumps (approx 3-4 mm in diameter) after 3 minutes.

The brew chamber produced a beverage with about 25-30 ml of very fine bubble milk foam on top of the drink which was very stable. Compared to stirring, there was much less insoluble residue remaining in this beverage, and it was only evident as very fine "sediment" at the bottom of the beaker which was less noticeable.

EXAMPLE 3

This uses a compressed 6.7 g Jacobs Kroenung™ R&G coffee disc having a diameter of 31 mm and a height of 13 mm. The disc was disintegrate using hot water at 95° C.

1. In cup—the time to disintegrate by stirring in 150 ml of hot water was 1 m 10 s.
2. In brew chamber—the time to disintegrate in 270 ml of water was 54 s.

The invention claimed is:

1. A machine for preparing a beverage or food product from a compressed disc of at least one ingredient, said machine comprising a sealable brew chamber, said brew chamber comprising means for mounting the disc so that it is able to spin freely around a central axis, and at least one nozzle having an outlet in the brew chamber located to direct a jet of liquid at a peripheral edge of the disc mounted in the brew chamber.

2. The machine of claim 1 in which the jet is continuous or pulsed.

3. The machine of claim 1 in which the disc mounting means comprises a spindle.

4. The machine of claim 3 in which the spindle project upwardly from a base of the brew chamber.

5. The machine of claim 3 in which the spindle is mounted on a spring loaded arm which biases the spindle towards the at least one nozzle.

6. The machine of claim 1 in which the brew chamber has an outlet in the form of at least one aperture.

7. The machine of claim 6 in which the flow of liquid through the brew chamber outlet is selectively controlled by valve means.

8. The machine as claimed in claim 1 in which the at least one nozzle is located in a side wall of the brew chamber.

9. The machine as claimed in claim 1 in which the at least one nozzle is located above the disc mounted in the brew chamber.

10. The machine as claimed in claim 1 in which the at least one nozzle is configured to provide a fan shaped spray.

11. The machine as claimed in claim 1 further comprising multiple nozzles.

12. The machine as claimed in claim 1 in which the brew chamber is provided with at least one air inlet.

13. The machine as claimed in claim 12 in which the at least one air inlet is located at a centre of the brew chamber and/or in a side wall of the brew chamber.

14. A machine as claimed in claim 12 in which the air inlet is selectively opened and closed by means of a valve.

15. The machine as claimed in claim 12 in which the air inlet is an eductor.

16. A machine as claimed in claim 1 further comprising means for adjusting the flow rate of the liquid sprayed unto the brew chamber.

17. A machine as claimed in claim 1 comprising means for adjusting the velocity of the jet of liquid sprayed into the brew chamber.

18. A system for the preparation of a beverage or food product comprising the machine as claimed in claim 1 and a compressed disc of at least one ingredient.

* * * * *